US012168382B2

(12) United States Patent
Testa

(10) Patent No.: US 12,168,382 B2
(45) Date of Patent: Dec. 17, 2024

(54) FRONT FRAME ASSEMBLY WITH SUSPENSION ATTACHMENT STRUCTURE FOR A MOTOR VEHICLE

(71) Applicant: FERRARI S.P.A., Modena (IT)

(72) Inventor: Daniele Testa, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/159,501

(22) Filed: Jan. 25, 2023

(65) Prior Publication Data

US 2023/0249507 A1  Aug. 10, 2023

(30) Foreign Application Priority Data

Feb. 10, 2022  (IT) .................. 102022000002435

(51) Int. Cl.
*B60G 7/00* (2006.01)
*B60T 5/00* (2006.01)
(Continued)

(52) U.S. Cl.
CPC ............... *B60G 7/008* (2013.01); *B60T 5/00* (2013.01); *B62D 21/11* (2013.01); *B62D 21/152* (2013.01); *B62D 65/12* (2013.01)

(58) Field of Classification Search
CPC ...... B62D 21/11; B62D 21/152; B62D 21/17; B62D 65/12; B62D 25/08; B60C 23/18;
(Continued)

(56) References Cited

U.S. PATENT DOCUMENTS 4,653,788 A * 3/1987 Di Giusto ............... B60R 19/48
296/180.1
4,805,747 A * 2/1989 Moedinger ............... B60T 5/00
188/71.6
(Continued)

FOREIGN PATENT DOCUMENTS

DE  102005044062 A1    5/2007
DE  102010037614 A1 *  3/2012  ............... B60T 5/00
(Continued)

OTHER PUBLICATIONS

Italian Search Report for Application No. 102022000002435; Filing Date—Feb. 10, 2022; Date of Mailing—Oct. 6, 2022, 8 pages.

*Primary Examiner* — Laura Freedman
(74) *Attorney, Agent, or Firm* — CANTOR COLBURN LLP

(57) ABSTRACT

A front frame assembly for a motor vehicle includes a suspension attachment structure fixable to a body cell, one or more attachment elements fixed relative to the suspension attachment structure to allow a suspension of the motor vehicle to be coupled to the suspension attachment structure, and an absorption element to absorb a front crash of the motor vehicle, the absorption element being fixed relative to the suspension attachment structure and extending in a projecting manner relative to the suspension attachment structure along a first straight axis until ending with one end opposite the suspension attachment structure, wherein the assembly comprises a channel extending with continuity through the absorption element and the suspension attachment structure between an inlet opening obtained at the end along the first axis and an outlet opening obtained in the suspension attachment structure along a second axis transversal to the first axis.

11 Claims, 2 Drawing Sheets

(51) Int. Cl.
    *B62D 21/11* (2006.01)
    *B62D 21/15* (2006.01)
    *B62D 65/12* (2006.01)
(58) Field of Classification Search
    CPC .......... B60C 23/19; B60G 7/008; B60G 7/02;
            B60G 2200/144; B60G 2200/44; B60G
            2204/143; B60G 2204/4302; B60G 3/20;
                                          B60T 5/00
    See application file for complete search history.

(56) References Cited

U.S. PATENT DOCUMENTS

| | | | | |
|---|---|---|---|---|
| 4,810,021 A * | 3/1989 | Burst | ................... | B62D 35/02 |
| | | | | 296/180.1 |
| 5,121,818 A * | 6/1992 | McComic | ................. | B60T 5/00 |
| | | | | 188/71.6 |
| 6,193,273 B1 * | 2/2001 | Novak | ................... | B62D 21/00 |
| | | | | 280/781 |
| 7,600,615 B2 * | 10/2009 | Ramsay | ................... | B60T 5/00 |
| | | | | 188/71.6 |
| 8,631,889 B2 * | 1/2014 | Begleiter | ................ | B60T 5/00 |
| | | | | 180/68.1 |
| 9,004,241 B2 * | 4/2015 | Browne | ................ | F16D 65/847 |
| | | | | 188/71.6 |
| 9,163,685 B2 * | 10/2015 | Carmassi | ............. | B62D 35/005 |
| 9,573,571 B2 * | 2/2017 | Weber | ................... | F16D 65/847 |
| 9,751,570 B2 * | 9/2017 | Kim | ................... | B62D 21/152 |
| 9,797,463 B1 * | 10/2017 | Skurkis | ................... | B60T 5/00 |
| 9,809,108 B2 * | 11/2017 | Ribaldone | ............. | B62D 37/02 |
| 10,160,308 B2 * | 12/2018 | Chae | ........................ | B60T 5/00 |
| 10,569,643 B2 * | 2/2020 | Gilotte | ................... | B60K 11/08 |
| 10,953,741 B2 * | 3/2021 | Temple | ................. | B60K 11/085 |
| 2015/0345578 A1 * | 12/2015 | Nightingale | ......... | B62D 35/005 |
| | | | | 188/264 AA |
| 2020/0062060 A1 | 2/2020 | Chevalier | | |
| 2021/0253172 A1 | 8/2021 | Shimoda et al. | | |
| 2023/0264743 A1 * | 8/2023 | Testa | ................... | B62D 21/152 |
| | | | | 280/788 |
| 2023/0264745 A1 * | 8/2023 | Testa | ........................ | B60G 3/20 |
| | | | | 296/187.09 |

FOREIGN PATENT DOCUMENTS

| | | |
|---|---|---|
| DE | 102014207548 A1 | 10/2015 |
| JP | S57199159 U | 12/1982 |
| WO | 0007867 A1 | 2/2000 |

* cited by examiner

FRONT FRAME ASSEMBLY WITH SUSPENSION ATTACHMENT STRUCTURE FOR A MOTOR VEHICLE

CROSS-REFERENCE TO RELATED APPLICATIONS

This patent application claims priority from Italian Patent Application no. 102022000002435 filed on Feb. 10, 2022, the entire disclosure of which is incorporated herein by reference.

TECHNICAL FIELD

The invention relates to a front frame assembly comprising a suspension attachment structure for a motor vehicle, particularly for a sports motor vehicle.

PRIOR ART

As is known, the front frame of a motor vehicle serves both to support body elements, i.e., external cladding plates, such as the bumper or bonnet, or various connection brackets, and to absorb front crashes, that is, crashes in the forward moving direction of the motor vehicle.

In particular, to absorb a front crash, the frame specifically includes an absorption box, also known as a "crash box" in English, which includes a pair of spars extending parallel to the forward moving direction and a crossbar fixed to the front ends of the spars immediately behind the bumper.

In some cases, the spars extend, in particular directly, from a suspension attachment structure, also known as a "shock tower" in English, including the attachments for the front suspension of the motor vehicle.

The front suspension couples the front wheel hubs of the motor vehicle to the suspension attachment structure.

The wheel hubs are normally braked by a braking device, often equipped with disc brakes, or more generally with elements which, by coming into contact with each other, generate a braking torque on the wheel hubs by friction.

It is known that the braking device, when braking the wheels, generates heat where the elements come into contact with each other. In fact, heat is the direct consequence of the friction underlying the braking torque.

The generated heat spreads to the area of the front wheel hubs and also at the front suspension and its suspension attachment structure.

Therefore, the areas where the heat spreads, and especially the elements of the braking device contacting each other, are usually cooled by channelling fresh air from outside the motor vehicle to the same areas and the same elements contacting each other.

For this purpose, the front frame also includes two ducts extending respectively alongside the spars and having dimensions similar to those of said spars.

Each of the ducts has two opposite ends, one ending with a vent on the crossbar and the other ending with a diffuser configured to diffuse air towards the areas to be cooled.

The vent on the crossbar corresponds to another vent on the bumper aligned with the former so that, with the movement of the motor vehicle, the air outside the latter passes through the aligned vents, thus travelling along the ducts and spreading to the areas to be cooled via the diffuser.

Although essential to counteract the heat generated by the braking device, the ducts are rather bulky and have disadvantages in terms of weight, cost, and freedom in designing the front frame.

In the light of the above, there is a need to improve the known motor vehicles, in particular by reducing dimensions, design constraints, weight, and costs.

The object of the invention is to meet the above requirements, preferably in a simple and reliable way, while still effectively counteracting the heat generated by the braking device.

DESCRIPTION OF THE INVENTION

The object is achieved by means of a front frame assembly for a motor vehicle as defined in claim 1.

The dependent claims define particular embodiments of the invention.

BRIEF DESCRIPTION OF THE DRAWINGS

To better understand the invention, one embodiment thereof is described hereinafter by way of non-limiting example and with reference to the accompanying drawings, wherein.

EMBODIMENTS OF THE INVENTION

Figure 1:
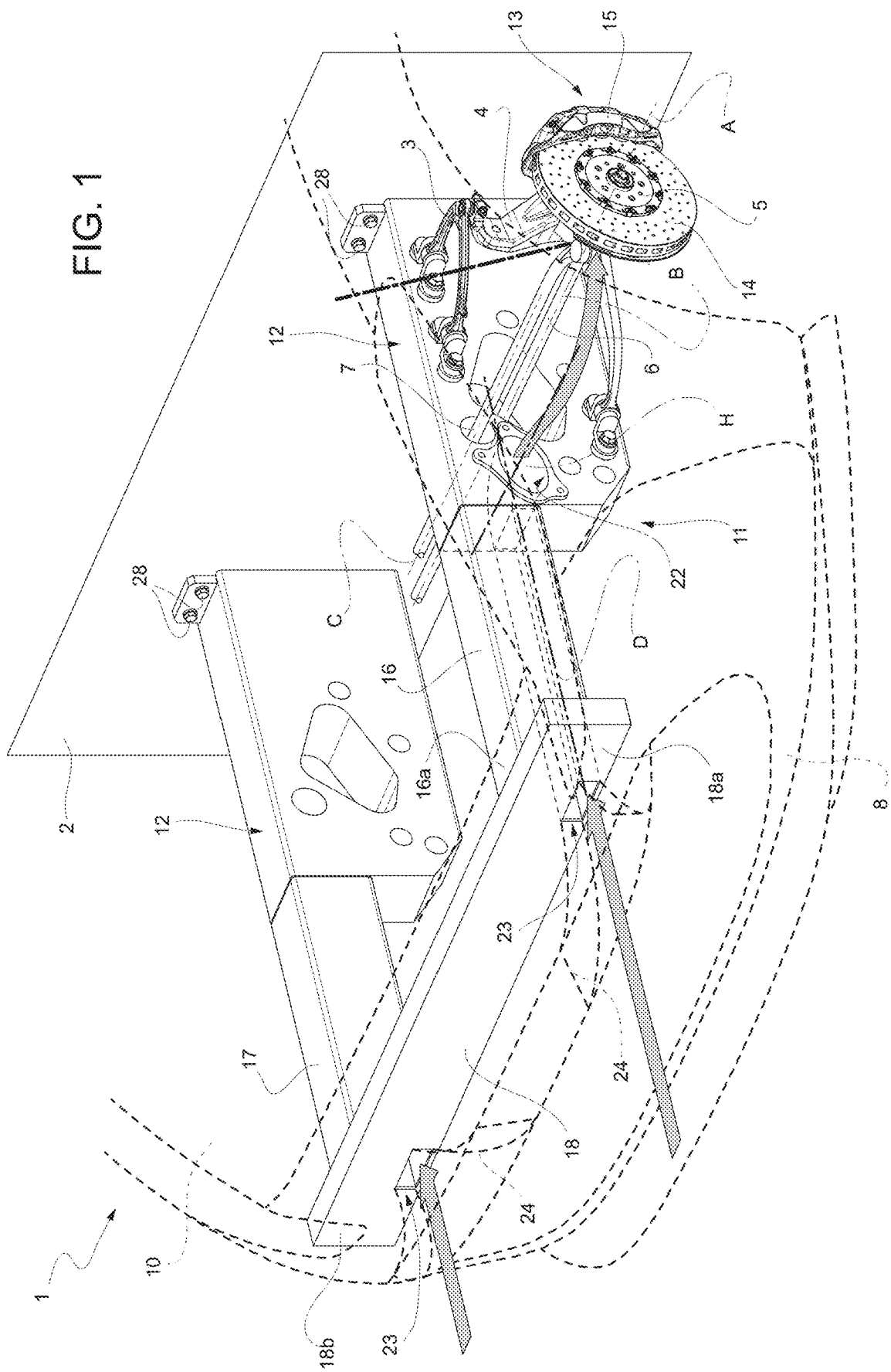
FIG. 1 is a schematic perspective view of a front portion of a motor vehicle comprising a frame assembly according to the invention.

In FIG. 1, reference number 1 is used to indicate a motor vehicle as a whole.

Like all motor vehicles, the motor vehicle 1 has a normal forward moving direction and includes a passenger compartment to accommodate at least one driver and possibly one or more passengers.

The motor vehicle 1 comprises a body cell 2 which defines or surrounds the passenger compartment. For example, the body cell 2 may be monolithic. In addition, the body cell can comprise or be made of carbon fibre.

The motor vehicle 1 further comprises at least one, some or all of the typical components such as a suspension 3, a knuckle 4, a wheel hub 5, an axle shaft 6, and a steering gear or steering box 7.

The wheel hub 5 has a portion that is fixed relative to the knuckle 4 and a portion rotating around an axis A transversal to the forward moving direction.

The fixed portion is carried by the knuckle 4, whereas the rotating portion is coupled to the axle shaft 6 so that it can be driven into rotation by the latter.

The axle shaft 6 extends along a straight axis B parallel to, but not necessarily coincident with, the axis A.

The steering box 7 extends along a further straight axis C parallel to the axes A, B, or transversal and more precisely orthogonal to the forward moving direction.

The steering box 7 is a well-known device coupled to the wheel hub 5 with the function of steering the fixed portion of the wheel hub 5, in particular transforming a rotary movement of a steering wheel (not shown) of the motor vehicle into a straight movement along the axis C useful for steering the fixed portion of the wheel hub 5.

In fact, the steering box 7 is more generally part of a steering unit of the motor vehicle 1, also including, for example, the steering wheel and configured to steer the fixed portion of the wheel hub 5.

Furthermore, the motor vehicle 1 comprises a braking device 13 configured to brake the wheel hub 5 or more precisely the rotating portion.

The braking device 13 comprises a first braking element 14, for example a disc, fixed relative to the rotating portion of the wheel hub 5, and a second braking element 15, for example a brake caliper, carried by the fixed portion of the wheel hub 5 or by the knuckle 4.

The second braking element 15 can be actuated, for example, via a known actuator, not shown, so that it is brought into contact with the first braking element 14, thus generating a braking torque on the rotating portion of the wheel hub 5 due to the friction developed by the contact between the braking elements 14, 15.

Moreover, the motor vehicle 1 comprises a front frame assembly 11, in particular fixed relative to the body cell 2 and serving, for example, to support body elements of the motor vehicle 1, i.e., external panels or plates, such as a bumper 8, a wing 9 (not shown), a bonnet 10, and the like.

The assembly 11 comprises a suspension attachment structure 12, alternately referred to as a "shock tower" in English.

The structure 12 is fixed relative to the body cell 2, i.e., it is fixed to it, for example by means of releasable fastening devices 28, in particular comprising threaded members such as bolts.

The structure 12 serves to support the suspension 3. In fact, the assembly 11 also comprises a plurality of attachment elements or attachments 19 configured to allow the suspension 3 to be coupled to the structure 12 in an area for placing the suspension 3. This area can also be considered suitable for placing each of the knuckle 4, the wheel hub 5, and the braking device 13.

The attachments 19 are located in the area of the structure 12 and may generally be part of it.

The structure 12 can preferably be a single piece, for example made using a casting technique or more precisely a die casting technique.

Figure 2:
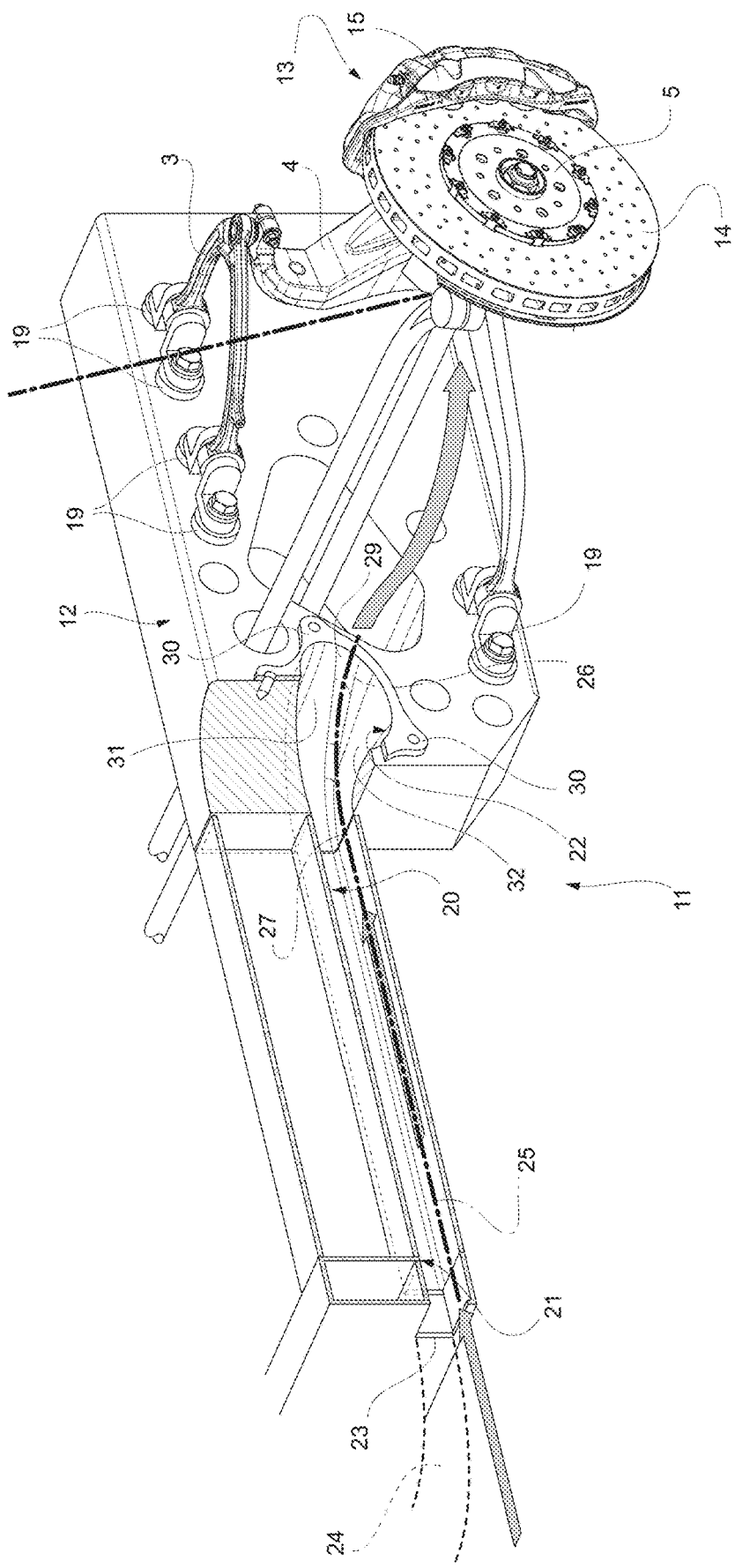
FIG. 2 is a cutaway view of a portion of the frame assembly.

Therefore, in the embodiment shown in FIGS. 1 and 2, the assembly 11 actually comprises two structures 12, preferably identical to each other, and arranged at the lateral ends of the body cell 2, in a direction orthogonal to the forward moving and horizontal direction. For the sake of brevity, the following description will only refer to one of the structures 12, it being understood that all the teachings described will also apply to the other of the structures 12.

The suspension 3 carries the knuckle 4 and therefore the wheel hub 5. In addition, the suspension 3 is coupled to the structure 12 through the attachments 19, in particular in a movable manner relative to the structure 12. In turn, the knuckle 4 is movable relative to the suspension 3.

The assembly 11 comprises at least one absorption element 16 to absorb a front crash of the motor vehicle 1. The absorption element 16 comprises, or more precisely is, a spar, i.e., a beam, in particular a box-shaped one, extending parallel to the forward moving direction of the motor vehicle 1.

The element 16 is distinct from the structure 12.

Furthermore, the element 16 is fixed relative to the structure 12, i.e., fixed to it.

The element 16 extends along a straight axis D parallel to the forward moving direction of the motor vehicle 1.

The element 16 extends from the structure 12, i.e., it protrudes or extends in a projecting manner relative to the structure 12, in particular towards the bumper 8, ending with one end 16*a* opposite the structure 12. Specifically, the element 16 extends directly from the structure 12, i.e., it protrudes or extends in a projecting manner directly from it.

Indeed, the assembly 11 also comprises another absorption element 17, preferably identical to the previous one and protruding parallel to the axis D from the other structure 12, which is not described in detail.

For the sake of brevity, the following description will only refer to the absorption element 16 of the absorption elements 16, 17, it being understood that all the teachings described will also apply to the absorption element 17.

In practice, the two portions of the assembly 11 defined by the absorption element 16 with its structure 12 and the absorption element 17 with its structure 12, respectively, can be identical to each other, i.e., have the same characteristics. More precisely, each of the characteristics of one portion may apply to the other portion.

Moreover, the assembly 11 comprises a third absorption element 18 to absorb a front crash of the motor vehicle 1. The absorption element 18 comprises, or rather is, a crossbar, i.e., a beam, in particular a box-shaped one, extending transversal and more precisely orthogonal to the forward moving direction of the motor vehicle 1, in particular horizontally.

The element 18 has two ends 18*a*, 18*b* fixed to the elements 16 and 17, respectively.

The end 18*a* is fixed at the end 16*a*.

The elements 16, 17, 18 are individually part of an absorption box of the assembly 11; the absorption box is alternately referred to as a "crash box" in English.

The assembly 11 comprises a channel 20 extending with continuity through the absorption element 16 and the structure 12 between an inlet opening 21 obtained at the end 16*a* along the axis D and an outlet opening 22 obtained in the structure 12 along an axis H towards the area for placing the suspension 3 or towards the braking device 13.

Specifically, the axis H is transversal or more precisely orthogonal to the axis D.

The absorption element 18 or more precisely the end 8*a* has a through vent 23, in particular along the axis D, suitable for conveying air to the channel 20 through the inlet opening 21.

More particularly, the vent 23 is aligned with the opening 21 along the axis D.

In practice, the vent 23 is adjacent to or matches with the opening 21.

Similarly, the bumper 8 has a through vent 24, in particular along the axis D, suitable for conveying air to the vent 23.

More particularly, the vent 24 is aligned with the vent 23 along the axis D.

In practice, the vent 24 is adjacent to or matches with the vent 23.

The channel 20 extends along a direction 27, which comprises in particular at least two segments 25, 26, of which the segment 25 is parallel or more precisely coincident with the axis D; the segment 26 is for example a connection between the axis D and the axis H, i.e., it connects the axes D, H.

More particularly, the channel 20 is defined by the segments 25, 26.

The segment 25 is a straight portion of the channel 20; this straight portion extends along the axis D and in particular extends over a length equal to that of the absorption element 16 along the axis D.

In other words, the straight portion extends from the opening 21 to the structure 12.

Consequently, the absorption element 16 is tubular and is crossed from side to side along the axis D by the segment 25.

The segment 26 is a curved end portion extending completely within the structure 12 and ending with the opening 22.

More generally, the channel 20 may comprise a reduced curved end portion compared to the entire segment 26. In any case, the curved end portion is inside the structure 12 and ends with the opening 22.

This is not strictly limiting, as the channel 20 could have included a straight end portion ending with the opening 22 along the axis H and a curved intermediate portion between the opening 21 or segment 25 and the straight end portion.

Preferably, the curved end portion comprises a diverging segment, such as an end segment ending with the opening 22 or an intermediate segment between the end segment and the segment 25.

This is not strictly limiting. In fact, in general, the channel 20 could comprise one or more diverging segments, possibly straight or curved. Each of the diverging segments could extend through the absorption element 16 or through the structure 12.

In the present case, the whole segment 26 is divergent, although even only one end portion thereof could have been divergent up to the opening 22.

Therefore, the diverging segment ends, in particular, with the opening 22.

As shown in FIG. 2, preferably, the curved end portion is defined by walls 31, 32 connected by a connection 29 having a radius that increases along the curved end portion towards the opening 22.

Conveniently, the assembly 11 further comprises a fixing interface 30 fixed relative to the structure 12 and arranged around the opening 22.

In particular, the fixing interface 30 comprises a bracket fixed to the structure 12. More particularly, the bracket defines a frame completely surrounding or enclosing the opening 22.

The fixing interface 30 is configured to allow a diffuser device, which is known per se and not shown, to be fixed to the structure 12. The function of the diffuser device is to direct air flowing out of the opening 22 towards the braking device 13.

In the prior art, as mentioned above at the beginning of the description, the diffuser device is normally used to direct air flowing out of an outlet opening of a dedicated duct not made through the absorption element 16 and the structure 12, but rather completely separate from each of the structure 12 and the absorption element 16. This duct, which is clearly different from the channel 20, is absent from the assembly 11 and more generally from the motor vehicle 1.

In particular, the diffuser device can be fixed to the structure 12 through the fixing interface 30 in a position in which it communicates with the opening 22, so that it can perform its function.

For example, the diffuser device can be coupled to the interface through known fastening devices, such as threaded members.

Likewise, the fixing interface 30 can be fixed to the structure 12 through known fastening devices, such as threaded members.

The advantages of the assembly 11 according to the invention are clear from the foregoing.

In fact, the assembly 11 provides the channel 20 integrated with the absorption element 16 and the structure 12. Therefore, the typical channel dedicated to the cooling of the known motor vehicle braking devices is no longer required, with consequent saving of space, costs, and weight.

Constructing the channel 20 is simple, especially since the absorption element 16 may already normally include a box-shaped beam, so it is sufficient to obtain the opening 21 to make the segment 25 inside the beam.

In addition, the segment 26 can also be made simply during the construction of the structure 12 by casting or more precisely die casting.

Finally, the shape of the channel 20 is optimized to effectively convey air from the outside of the motor vehicle 1 to the braking device 13.

Lastly, it is clear that modifications and variations may be made to the assembly 11 according to the invention, without however departing from the scope of protection defined by the claims.

In particular, the number and shape of the components described and illustrated herein could be different, and in particular varied with great freedom.

The invention claimed is:

1. A front frame assembly (11) for a motor vehicle (1), the front frame assembly (11) comprising
   a suspension attachment structure (12) fixable to a body cell (2) defining a passenger compartment of the motor vehicle (1),
   one or more attachment elements (19) fixed relative to the suspension attachment structure (12) and configured to allow a suspension (3) of the motor vehicle (1) to be coupled to the suspension attachment structure (12) in an area for placing the suspension (3),
   an absorption element (16) to absorb a front crash of the motor vehicle (1), the absorption element (16) being fixed relative to the suspension attachment structure (12) and extending in a projecting manner relative to the suspension attachment structure (12) along a first straight axis (D) up to ending with an end (16a) being opposite relative to the suspension attachment structure (12), and
   a channel (20) extending with continuity through the absorption element (16) and the suspension attachment structure (12) between an inlet opening (21) obtained at said end (16a) along the first axis (D) and an outlet opening (22) obtained in the suspension attachment structure (12) along a second axis (H) transversal to the first axis (D) towards said area for placing the suspension (3).

2. The assembly according to claim 1, wherein the channel (20) comprises a curved end portion (26) inside the suspension attachment structure (12) and ending with the outlet opening (22).

3. The assembly according to claim 2, wherein the curved end portion (26) comprises a diverging segment.

4. The assembly according to claim 3, wherein the diverging segment ends with the outlet opening (22).

5. The assembly according to claim 1, wherein the channel comprises a straight portion (25) extending along the first axis (D) over a length equal to that of the absorption element (16) along the first axis (D).

6. The assembly according to claim 1, comprising a crossbar (18) fixed to the absorption element (16) at said end (16a) and having a through vent (23) to convey air to the channel (20) through the inlet opening (21).

7. The assembly according to claim 1, further comprising a fixing interface (30) fixed relative to the suspension attachment structure (12), arranged around the outlet opening (22) and configured to allow a diffuser device to be fixed to the suspension attachment structure (12) in a position in which the diffuser device communicates with the outlet opening (22), such that the diffuser device can direct air flowing out of the outlet opening (22) towards a braking device (13).

8. The assembly according to claim 1, wherein the absorption element (16) comprises or is defined by a spar.

9. The assembly according to claim 1, wherein the suspension attachment structure (12) is a single piece.

10. A motor vehicle (1) comprising
a passenger compartment,
a body cell (2) defining the passenger compartment,
a suspension (3),
a wheel hub (5) carried by the suspension (3),
a braking device (13) configured to brake the wheel hub (5), and
a front frame assembly (11) according to claim 1,
wherein the suspension attachment structure (12) of the front frame assembly (11) is fixed to the body cell (2), and wherein the suspension (3) is coupled to the one or more attachment elements (19),
and wherein the first axis (D) is parallel to a forward moving direction of the motor vehicle (1),
the outlet opening (22) facing the braking device (13).

11. The motor vehicle according to claim 10 and further comprising:
a fixing interface (30) fixed relative to the suspension attachment structure (12) and arranged around the outlet opening (22), and
a diffuser device fixed to the suspension attachment structure (12) through the fixing interface (30) in a position in which the diffuser device communicates with the outlet opening (22),
the diffuser device being configured to direct air flowing out of the outlet opening (22) towards the braking device (13).

\* \* \* \* \*